(12) United States Patent
Shah

(10) Patent No.: US 11,144,372 B2
(45) Date of Patent: Oct. 12, 2021

(54) CROSS-PLATFORM STATELESS CLIPBOARD EXPERIENCES

(71) Applicant: Microsoft Technology Licensing, LLC, Redmond, WA (US)

(72) Inventor: Shrey Nitin Shah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 132 days.

(21) Appl. No.: 16/589,461

(22) Filed: Oct. 1, 2019

(65) Prior Publication Data
US 2021/0042171 A1 Feb. 11, 2021

Related U.S. Application Data

(60) Provisional application No. 62/884,489, filed on Aug. 8, 2019.

(51) Int. Cl.
G06F 9/44 (2018.01)
G06F 9/54 (2006.01)
G06F 3/0484 (2013.01)

(52) U.S. Cl.
CPC .......... G06F 9/543 (2013.01); *G06F 3/04842* (2013.01)

(58) Field of Classification Search
CPC ....................................... G06F 9/543

USPC ......................................................... 719/320
See application file for complete search history.

(56) References Cited

U.S. PATENT DOCUMENTS

2018/0335998 A1* 11/2018 Callaghan .............. G06Q 10/10

OTHER PUBLICATIONS

"International Search Report and Written Opinion Issued in PCT Application No. PCT/US20/037352", dated Sep. 21, 2020, 13 Pages.

* cited by examiner

*Primary Examiner* — Timothy A Mudrick

(57) ABSTRACT

In non-limiting examples of the present disclosure, systems, methods and devices for assisting with cross-platform copy and paste operations are provided. A first and second computing device may be connected. When a copy command is received in relation to an object, the object may be copied to the copying device's clipboard. Metadata describing the object may be sent to the other device. A paste command may be received by the pasting device and that command may be relayed to the device where the copy command was received. The object may be sent from the copying device to the pasting device and injected/pasted directly into the construct where the paste command was received. The object may be translated into a compatible format prior to its injection/pasting.

20 Claims, 9 Drawing Sheets

… (1)

CROSS-PLATFORM STATELESS CLIPBOARD EXPERIENCES

RELATED APPLICATIONS

This application is related to and claims priority to U.S. Provisional Patent Application No. 62/884,489, filed Aug. 8, 2019, and entitled "CROSS-PLATFORM STATELESS CLIPBOARD EXPERIENCES," which is hereby incorporated by reference in its entirety.

BACKGROUND

Computing devices have become ubiquitous in most aspects of life. It is now common for users to be connected to at least one device at any given time, and sometimes even two or three devices at once. One of the reasons that computing devices have become so ubiquitous to everyday users is due to the number of options available to those users. For any given device type (e.g., phone, tablet, laptop, desktop) there are multiple device manufacturers with their own set of hardware configurations, in addition to unique operating system types and application suites that may be run on those devices. Thus, it is not uncommon for a user to have, and frequently use, a smart phone that operates on a first platform, a tablet that operates on a second platform, and one or more desktop and/or laptop computing devices that operate on one or more additional platforms.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for assisting with cross-platform copy and paste operations. A first platform device and a second platform device may be connected (e.g., via network connection, via Bluetooth, via Wi-Fi, etc.). A request to copy an object from an application or shell construct executed on the first platform device may be received. The object may be copied to an electronic clipboard that is local to the first platform device. Metadata describing the object may be generated and/or copied from the object. The metadata may describe at least a file type of the object. The metadata describing the object may be transferred to the second platform device. A paste command may be received by the second platform device. The command may be received by an application and/or shell construct executed by the second platform device. A paste request to transfer the object to the second platform device may be received from the second platform device by the first platform device. The object may be transferred to the second platform device where it may be injected/pasted into an application or shell construct where the paste command was received. In some examples, the object may be translated into a format that is compatible with the second platform device. In other examples, a link or shortcut to a compatible object may be injected/pasted into the application or shell construct where the paste command was received.

BRIEF DESCRIPTION OF THE DRAWINGS

Non-limiting and non-exhaustive examples are described with reference to the following figures.

DETAILED DESCRIPTION

Figure 1:
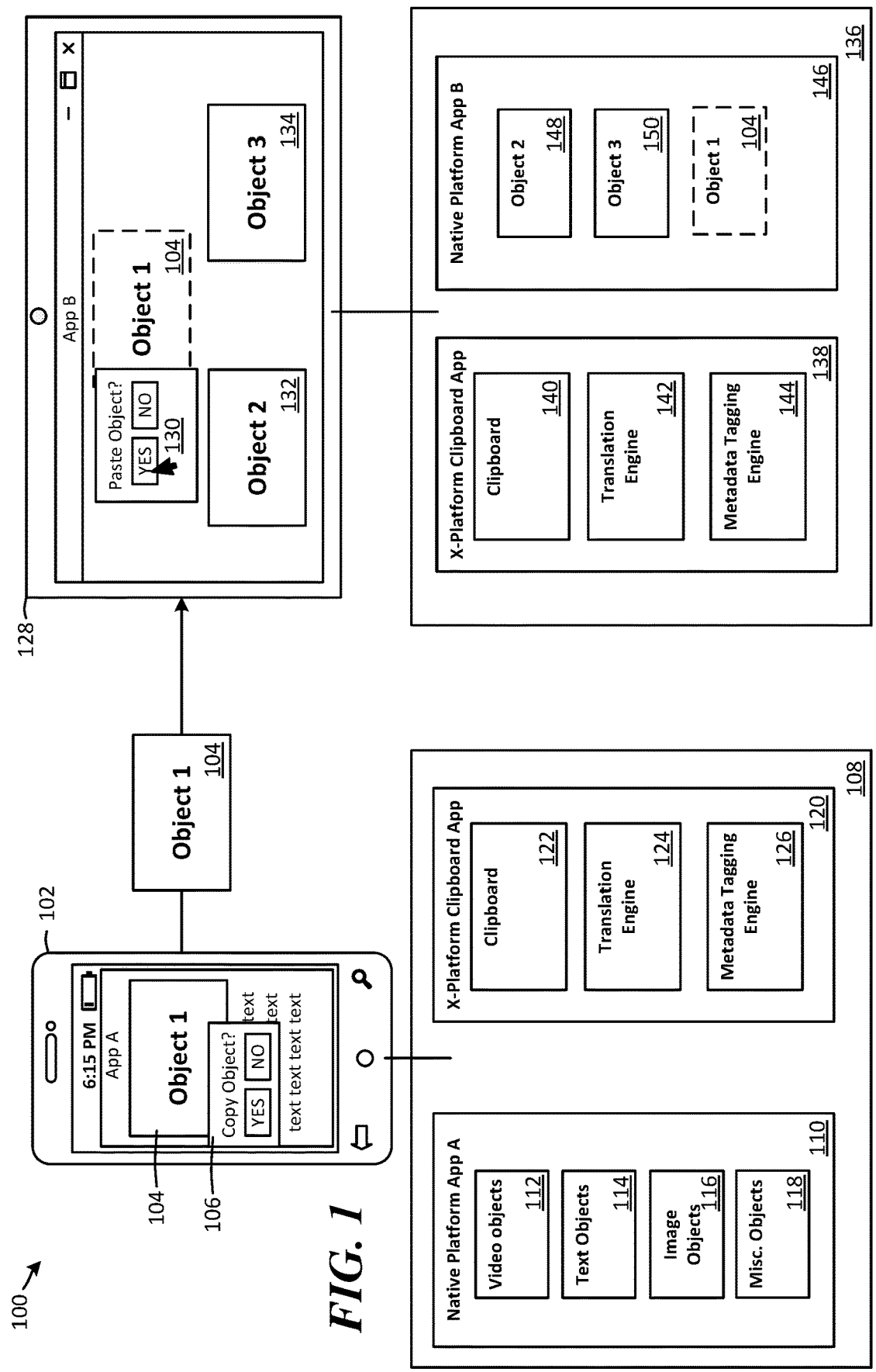
FIG. 1 is a schematic diagram illustrating an example distributed computing environment for assisting with cross-platform copy and paste operations.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for assisting with cross-platform copy and paste operations. As used herein, "platform" describes a specific environment comprised of a set of computer hardware and an operating system on which software is executed. For example, a first computing device may be said to run on a first platform that is different than a second platform if it has a unique set of one or both of: hardware components and/or an operating system (including an operating system version), and a second computing device may be said to run on a second platform that is different from the first platform if it has a set of one or both of: hardware components and/or an operating system (including an operating system version), that is different than the first computing device.

According to examples, a first platform computing device and a second platform computing device may connect with one another (e.g., via network connection, via Bluetooth, via Wi-Fi, etc.). Each of the devices may be running a cross-platform application that assists with the transfer of content from one platform device to the other. In some examples, the application may be a cross-platform clipboard application. The cross-platform clipboard application may assist with "copy-paste" operations that enable the semantics of an electronic clipboard between a plurality of devices. When an indication is received at the first platform computing device to copy an object in an application or shell construct executed by the first platform computing device, the object may be made available for pasting on the first platform computing device and/or the second platform computing device. In some examples, the object may be made available by being saved to an electronic clipboard and/or other temporary storage location of the first platform computing device. In other examples, the object may be made available via other mechanisms and/or storage locations (e.g., via a user interface accessibility tree, via an application-specific API, via a clipboard manager application, etc.). Upon making the object available for pasting, metadata describing the object may be generated and/or copied by the first platform computing device and that metadata may be transferred via the connection to the second platform computing device where the transferred metadata may be saved. In some examples, the metadata may be saved to an electronic clipboard and/or other temporary storage location of the second platform computing device. Other storage locations for storing the metadata on the second platform computing device are within the scope of the invention (e.g., a clipboard manager application, an application-specific temporary storage location via an application-specific API, etc.).

When a paste command is received in an application or shell construct executed by the second platform computing device, a request for the object may be sent to the first platform computing device. A determination may be made as to whether the object is compatible with the second platform computing device, an application of the second platform device where the past command is received, and/or a shell construct where the past command is received. If the object is compatible with the second platform computing device, application, and/or shell construct where the paste command is received, it may be sent directly to the second platform computing device and injected/pasted into the application or shell construct where the paste command was received. If the object is not compatible with the second platform computing device, application, and/or shell construct where the paste command is received, it may be translated into a format that is compatible with the second platform computing device, application, and/or shell construct where the paste command is received, and once translated, it may be injected/pasted into the application or shell construct where the paste command was received. The translation of the object may be performed at either or both of the devices. If the object is not able to be translated by either of the devices a determination may be made as to whether a compatible object corresponding to the copied object is accessible and/or downloadable from a secondary source. If a compatible object corresponding to the copied object is accessible and/or downloadable from a secondary source, a link and/or shortcut may be pasted into the application or shell construct where the paste command was received by the second platform computing device.

According to some examples, rather than transferring metadata corresponding to the copied object over to the pasting computing device, the copying computing device may send the object directly to the pasting computing device when the copy command is received. The object may then be saved to the pasting computing device's clipboard and/or other temporary storage location until a paste command is received, and when that paste command is received, the pasting computing device may inject/paste the object from its clipboard and/or other temporary storage location into the application and/or shell construct where the paste command was received. In some examples, a determination may be made to execute this operation flow rather than transferring the object metadata to the pasting computing device based on one or more factors. For example, if a determination is made that the object size is below a certain threshold (e.g., less than five megabytes, less than 10 megabytes, etc.), the copying computing device may send the object to the pasting computing device upon receiving the copy command. In another example, if a determination is made that the network conditions allow for efficient data transfer of the object (e.g., a threshold MBPS transfer rate, a threshold MBPS transfer rate given the size of the object that was copied), the copying computing device may send the object to the pasting computing device upon receiving the copy command. In yet another example, a determination may be made as to a likelihood that the copied object will be pasted by the pasting computing device, and if a threshold likelihood is reached, the copying computing device may send the object to the pasting computing device upon receiving the copy command. The likelihood may be determined based on one or more signals and/or factors, including: past user data (e.g., similar objects that have been copied and pasted by the user, similar objects that have been copied and pasted by other users), types of documents that are currently open on the copying and/or pasting computing devices, and/or number of copied and/or pasted objects during a computing session. Additional factors and/or computing models may be analyzed and/or executed in making a determination as to whether to send the object directly to the pasting computing device when a copy command is received (e.g., machine learning models may be applied to one or more user, demographic, application, and/or document signals).

The systems, methods, and devices described herein provide technical advantages for transferring objects across computing devices operating on different platforms. Processing costs (i.e., CPU cycles) associated with transferring objects from a first platform device to a second platform device are greatly reduced in that an object does not need to be manually converted to a compatible file type for reading by the second platform device. Rather, a translation engine may identify compatible format types across devices and automatically translate an object from a first, non-compatible format, to one or more compatible formats. Additionally, rather than requiring that an object from a first platform device be copied to a removable storage device (e.g., a USB drive) and physically transferred via that removable storage device, the current mechanisms allow for efficient copy and paste interactions across different platforms via wireless communication. Further, whereas most solutions related to cross platform copy and paste experiences only provide for limited data payload types to be transferred (e.g., plain text, limited image types), the mechanisms described herein may be applied to a vast number of payload types due to the utilization of a translation engine. Additionally, the mechanisms described herein provide for a more secure transfer of objects across different platforms, as objects may be transferred directly from a first platform device to a second platform device, whereas even limited payload solutions in the field had traditionally required that an object be saved to the cloud.

FIG. 1 is a schematic diagram illustrating an example distributed computing environment 100 for assisting with cross-platform copy and paste operations. Computing environment 100 includes mobile computing device 102, which operates on a first platform, and computing device 128, which operates on a second platform. Computing environment 100 also includes first platform computing components 108, which include native platform application A 110 and cross-platform clipboard application 120, both of which are executed at least in part by mobile computing device 102. Similarly, computing environment 100 includes second platform computing components 146, which include native platform application B 146 and cross-platform clipboard application 120, both of which are executed at least in part by computing device 128. Mobile computing device 102 and computing device 128 are communicatively connected. The connection may comprise a local area network connection, a network service connection, a Bluetooth connection, a Wi-Fi connection, or other wired or wireless connection type.

Mobile computing device 102 is currently executing native platform application A 110, which is an application that is native to the platform that mobile computing device 102 operates on. Native platform application A 110 may include video objects 112, text objects 114, image objects 116, and/or one or more additional object types as illustrated by miscellaneous objects 118. One or more of the object types included in native platform application A 110 may be represented in a format that is executable and/or readable by the platform of mobile computing device 102, but not the platform of computing device 128. In other examples, one or more of the object types included in native platform application A 110 may be represented in a format that is executable and/or readable by the platform of mobile computing device 102 and the platform of computing device 128.

In this example, an indication to copy an object from native platform application A 110 displayed on mobile computing device 102 has been received. Specifically, an indication to copy object 1 104 has been received. The indication may comprise a touch and hold input, a double tap input, a cursor input, a voice command, etc. Based on the received indication, pop-up window 106 is surfaced on the display of mobile computing device 102, which provides a selectable option to copy object 1. Specifically, pop-up window 106 includes surfaced text: "Copy Object"—"Yes" "No". In this example, a user affirmatively selects the "Yes" element to copy object 1 104 from native platform application A. Upon receiving the affirmative indication to copy object 1 104, that object may be copied to a temporary storage location. In this example the temporary storage location is electronic clipboard 122. In this example, electronic clipboard 122 is illustrated as being included in cross-platform clipboard application 120. However, electronic clipboard 122 may be a clipboard that is integrated in the operating system of mobile computing device 102. Metadata tagging engine 126 may analyze object 1 104 and generate and/or copy metadata describing object 1 104 that may be transferred to a temporal storage location on computing device 128. In this example, the temporary storage location is clipboard 140, which is illustrated as being part of cross-platform clipboard application 138. In some examples, cross-platform clipboard application 138 may be integrated in the operating system of computing device 128. The metadata that is generated for an object may comprise one or more of: a file type of a copied object; a size of a copied object (e.g., 1 megabyte, 1 gigabyte), a string number associated with a text object, a pixel number associated with an image object, and/or a frame number associated with a video object, for example.

According to some examples, native platform application B 146 may be capable of reading and executing the native file type of object 1 104 in its original format (i.e., the format that it is in while being displayed/executed by mobile computing device 102). In such examples, when an indication is received to paste content in native platform application B 146 (e.g., via paste element 130), cross-platform clipboard application 138 may determine based on the object metadata saved to clipboard 140 that there is an object that has been copied from mobile computing device 102. Cross platform clipboard application 138 may thus request that object 1 104 be transferred to it, cross-platform clipboard application 120 may subsequently transfer object 1 104 to cross-platform clipboard application 138, which may inject/paste object 1 104 directly into native platform application B 146 in its original format. As such, object 1 104 does not need to be copied over to clipboard 140 prior to being pasted into native platform application B 146. Additionally, where an object that is being copied is executable by the computing device that the object is being pasted into, translation of that object to a different format is not necessary. However, even in such examples, a determination may be made that the object should be translated into one or more other formats/file types. For example, an object may be translated to a richer or less rich file type based on the device capabilities of the respective devices.

According to additional examples, native platform application B 146 may not be capable of reading and/or executing the native file type of object 1 104 in its original format. In such examples, when an indication is received to paste content in native platform application B 146 (e.g., a right click and paste selection, a control+V selection, a control+P selection), cross-platform application 138 may determine based on the object metadata saved to clipboard 140 that there is an object that has been copied from mobile computing device 102. Cross platform clipboard application 138 may thus request that object 1 104 be transferred to it. In some examples, based on a file type of the object that is indicated in the metadata stored on electronic clipboard 140, cross-platform clipboard application 138 may request that the object be translated to a file type that it can read and/or execute. In some examples, the translation of the object to a different file type may take place on the transferring computing device (e.g., via translation engine 124 on mobile computing device 102). In other examples, the translation of the object to a different file type may take place on the receiving computing device (e.g., via translation engine 142 on computing device 128). In still other examples, the translation of the object to a different file type may take place in part on the transferring computing device and in part on the receiving computing device. Thus, if object 1 104 is translated by translation engine 124, it may then be transferred to computing device 128 via cross-platform clipboard application 138 and injected/pasted directly into native platform application B 146. Alternatively, if object 104 is translated by translation engine 124, it may be received by cross-platform clipboard application 138 in its native format from cross-platform clipboard application 120, subsequently translated by translation engine 142, and injected/pasted into native platform application B 146. There is no requirement in these examples that the copied object file itself is ever stored in the clipboard of the receiving computing device (e.g., electronic clipboard 140). Rather, only the metadata describing the object need be stored in a temporary location of the receiving computing device (e.g., the clipboard of the receiving computing device).

In still additional examples, the object that is copied from the transferring device (e.g., mobile computing device 102) may be in a format that is not capable of being translated, by a translation engine on either the transferring device or the receiving device, into a form that is readable/executable by the receiving computing device. For example, the object that is copied may be an application that is in a format that is native to the transferring device and which is not capable of being translated by one of the translation engines on the transferring or receiving devices. In examples where the copied object is not capable of being translated into a compatible format by one of the translation engines, when an indication is received to paste the object, the receiving device may determine whether the object may be linked to for downloading in a format that is compatible with the receiving computing device, and if so, the receiving computing device may paste a link and/or shortcut to that downloadable object in the application and/or shell construct (e.g., if a paste command is received in a desktop, if a paste command is received in a file browsing element) where the paste request is received. For example, if an application that is in a unique format to mobile computing device 102 is copied, metadata describing that object type may be sent and copied to clipboard 140, cross-platform clipboard application 138 may determine that the object cannot be translated to a readable/executable format by a translation engine, cross-platform clipboard application 138 may identify that the application is downloadable from an app store in a format that is compatible with computing device 128, and a link to that download may be pasted to an application and/or shell construct where the paste command is received.

Although mobile computing device 102 is illustrated and described above as the copying computing device and computing device 128 is illustrated and described above as the pasting computing device, it should be understood that the alternative may be performed utilizing the mechanisms described herein. That is, an indication to copy an object from an application and/or shell element of computing device 128 may be received, metadata describing that object may be transferred to mobile computing device 102, mobile computing device 102 may save that metadata to clipboard 122, a request to paste the object may be received via an application and/or shell element of mobile computing device 102, the object may be requested from computing device 128 by mobile computing device 102, that object may be translated by one or more translation engines executed by one or both of computing device 128 and/or mobile computing device 102, and the translated or untranslated object may be injected/pasted to the application and/or shell element of mobile computing device 102.

Figure 2:
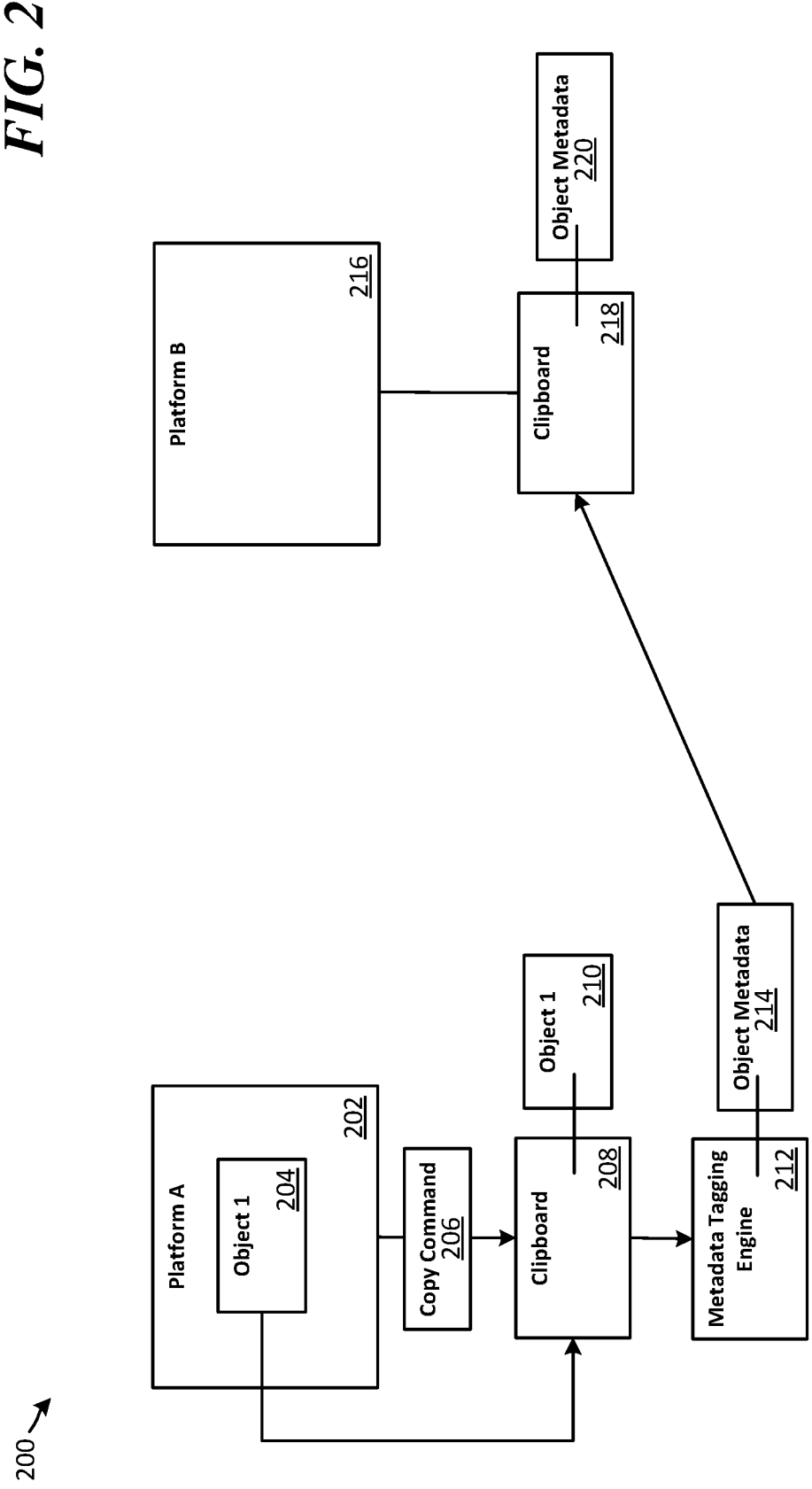
FIG. 2 is a schematic diagram illustrating an example distributed computing environment for performing operations associated with the object copying elements of a cross-platform copy and paste operation.

FIG. 2 is a schematic diagram illustrating an example distributed computing environment 200 for performing operations associated with the object copying elements of a cross-platform copy and paste operation. Computing environment 200 includes platform A 202, which is illustrative of a first device and/or operating system from which a copy command is received, and platform B 216, which is illustrative of a second device and/or operating system from which a paste command is received.

Platform A 202 includes object 1 204, which may be any type of object (e.g., text, image, video, folder, application). Object 1 204 may be stored and/or accessible via an application and/or shell construct executed by platform A 202. In some examples, object 1 204 may be representative of multiple objects (i.e., multiple objects may be copied and pasted via the mechanisms described herein—a single copy command for multiple objects may be received—a single paste command for to paste those multiple objects may be received). Platform A 202 comprises electronic clipboard 208, which may be comprised in the operating system of platform A 202 and/or in a cross-platform clipboard application executed by platform A 202. Electronic clipboard 208 is illustrative of a temporary storage location where object 204/210 may be saved. Other temporary storage locations and/or mechanisms may be utilized and are within the scope of the invention (e.g., user interface accessibility trees, application-specific APIs, clipboard manager applications, etc.). Platform A 202 also comprises metadata tagging engine 212, which is comprised in the cross-platform clipboard application executed by platform A 202.

Platform B 216 comprises electronic clipboard 218, which may be comprised in the operating system of platform B 216 and/or in a cross-platform clipboard application executed by platform B 216.

In this example, platform A 202 receives a copy command 206 in relation to object 1 204. The copy command 206 may be a right click and copy input, a verbal command, a touch and hold command, etc. When the copy command 206 is received, platform A 202, which received that command in relation to object 1 204, copies and sends object 1 204 to clipboard 208 and/or a different temporary storage location, as illustrated by object 1 210. Metadata tagging engine 212 generates object metadata 214 and/or copies object metadata 214 from object 1 210 that describes a file type of object 1 210, but which might additionally or alternatively describe a size, file version, string number, pixel number, and/or frame number of object 1 210. Object metadata 214 is transferred via the connection between Platform A 202 and Platform B 216 (e.g., via Wi-Fi, via Bluetooth) to clipboard 218, as illustrated by object metadata 220. Clipboard 218 is illustrative of a temporary storage location where metadata 220 may be saved. Other temporary storage locations are contemplated and are within the scope of the invention (e.g., application-specific storage locations and APIs, clipboard manager applications, etc.).

Figure 3:
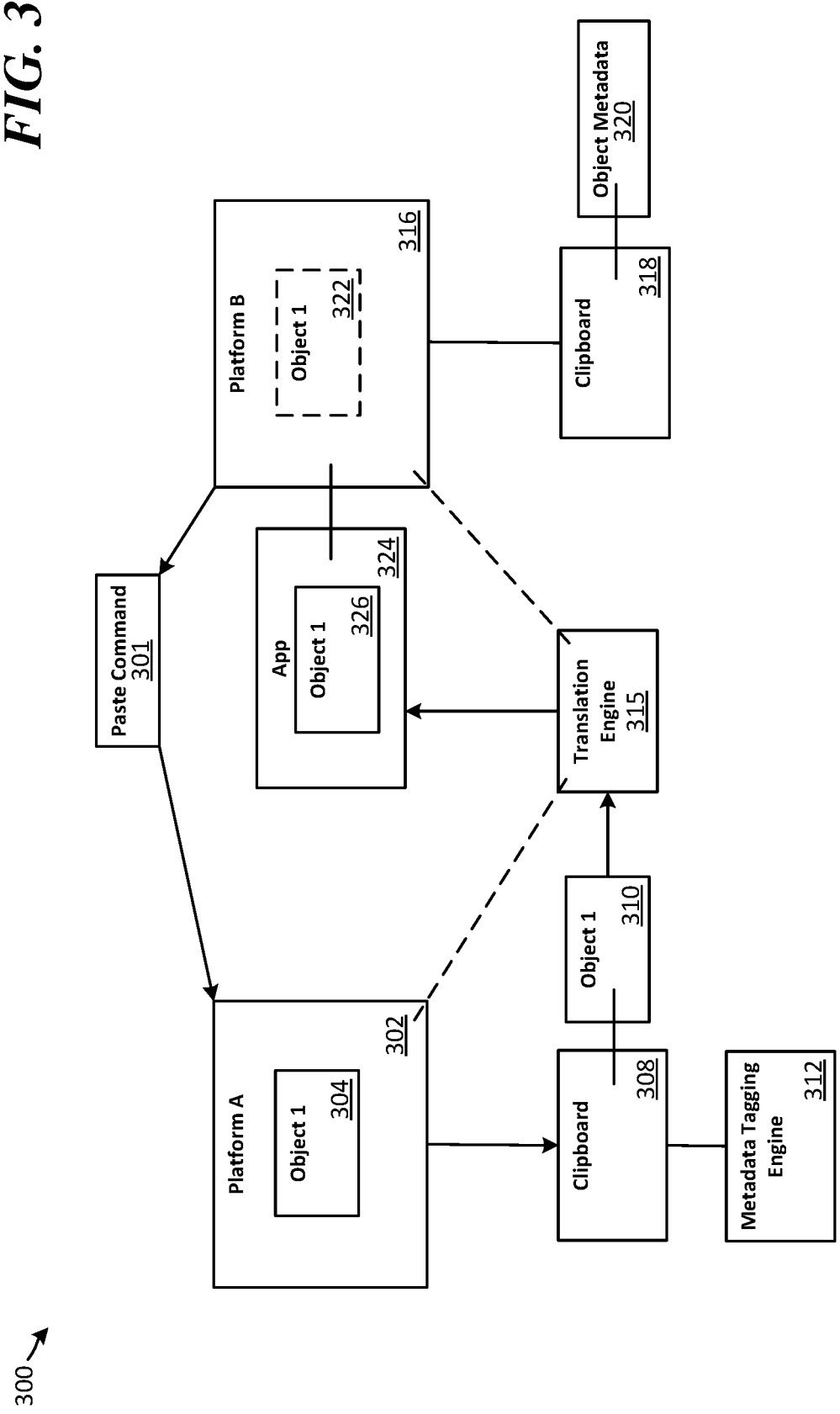
FIG. 3 is a schematic diagram illustrating an example distributed computing environment for performing operations associated with the object pasting elements of a cross-platform copy and paste operation.

FIG. 3 is a schematic diagram illustrating an example distributed computing environment 300 for performing operations associated with the object pasting elements of a cross-platform copy and paste operation. That is, FIG. 3 is a continuation of the copy and paste mechanism discussed above in relation to FIG. 2, where FIG. 2 was directed to the copy operations and FIG. 3 is directed to the paste operations. Computing environment 300 includes platform A 302, which is illustrative of a first device and/or operating system from which a copy a copy command has been received, and platform B 316, which is illustrative of a second device and/or operating system from which a paste command is received.

As part of the copy operations, a copy command related to object 1 304 has been received, object 304 has been subsequently copied to electronic clipboard 308 (illustrated there as object 1 310), and object metadata 320 for the object has been sent and stored in electronic clipboard 318. Although object 304 is illustrated and described as being copied to electronic clipboard 308, other temporary storage locations and/or mechanisms may be utilized and are within the scope of the invention (e.g., application-specific APIs, clipboard manager applications, etc.). Similarly, electronic clipboard 318 is simply illustrative of a temporary storage location where object metadata 320 may be stored. Other temporary storage locations and/or mechanisms are contemplated.

Moving to the paste operations, a paste command is received by platform B 316. An indication that the paste command has been received by platform B 316 is sent to platform A 302. In some examples, that indication may be sent by a cross-platform clipboard application executed on platform B 316, and the indication may be received by a cross-platform clipboard application executed on platform A 302. The transfer of that indication from platform B 316 to platform A 302 is illustrated by paste command 301.

According to examples, a determination may be made as to whether object 1 310 is in a suitable format for reading/executing by platform B 316. If a determination is made that object 1 310 is in a format that is capable of being read/executed by platform B 316, platform A 302 may send object 1 310 directly to platform B 316 where object 1 310 may be injected/pasted directly into an application and/or shell construct where the paste command was received. In this example, object 1 310 is illustrated as being injected/pasted into application 324, as illustrated by object 1 326. In examples where a determination is made that object 1 310 is not capable of being read/executed by platform B 316, a translation engine executed by one or both of platform A 302 and/or platform B 316 may make a determination as to whether it is capable of translating object 1 310 into a format that is readable/executable by platform B 316. In this example, a single translation engine 315 is illustrated as being attached to one or both of platform A 302 and platform B 316. It should be understood that the translation of object 1 310 to a different format may take place prior to its transfer from platform A 302 to platform B 316 and/or after object 1 310 being received by platform B 316. In some examples, translation engine 315 may translate object 1 310 into multiple different formats. In other examples, a selectable option may be surfaced on one or both of platform A 302 and/or platform B 316 that includes a plurality of selectable format types that object 1 310 may be translated into, and a user may select which of those format types object 1 310 will be translated into. Once translation of object 1 310 has been accomplished, object 1 310 may be injected/pasted directly into an application and/or shell construct of platform B 316 where the paste command was received.

In examples where a determination is made that platform B 316 is not capable of reading and/or executing object 1 310 in its native format, and that a translation engine is not capable of transforming object 1 310 into a format that platform B 316 can read and/or execute, a determination may be made as to whether object 1 310 may be obtained and/or accessed from a secondary source (e.g., an app store, a file storage site) in a format that is readable and/or executable by platform B 316. This determination may be made by one or both of platform A 302 and/or platform B 316. In examples where a determination is made that object 1 310 may be obtained and/or accessed from a secondary source in a format that is readable and/or executable by platform B 316, platform B 316 may paste a shortcut and/or link to that location. A user may thus interact with the shortcut and/or link for obtaining and/or accessing object 1 310 in a suitable format for reading and/or execution by platform B 316.

In examples where object 1 310 cannot be translated by a translation engine to a format that is readable and/or executable by platform B 316, and where object 1 310 cannot be obtained and/or accessed from a secondary source in a suitable format, an indication that the copied object cannot be properly read and/or executed by platform B may be surfaced by platform B. For example, when a user attempts to paste the object, a greyed-out icon and/or crossed out icon corresponding to the object may be pasted in the application and/or shell construct where the paste command was received.

Figure 4:
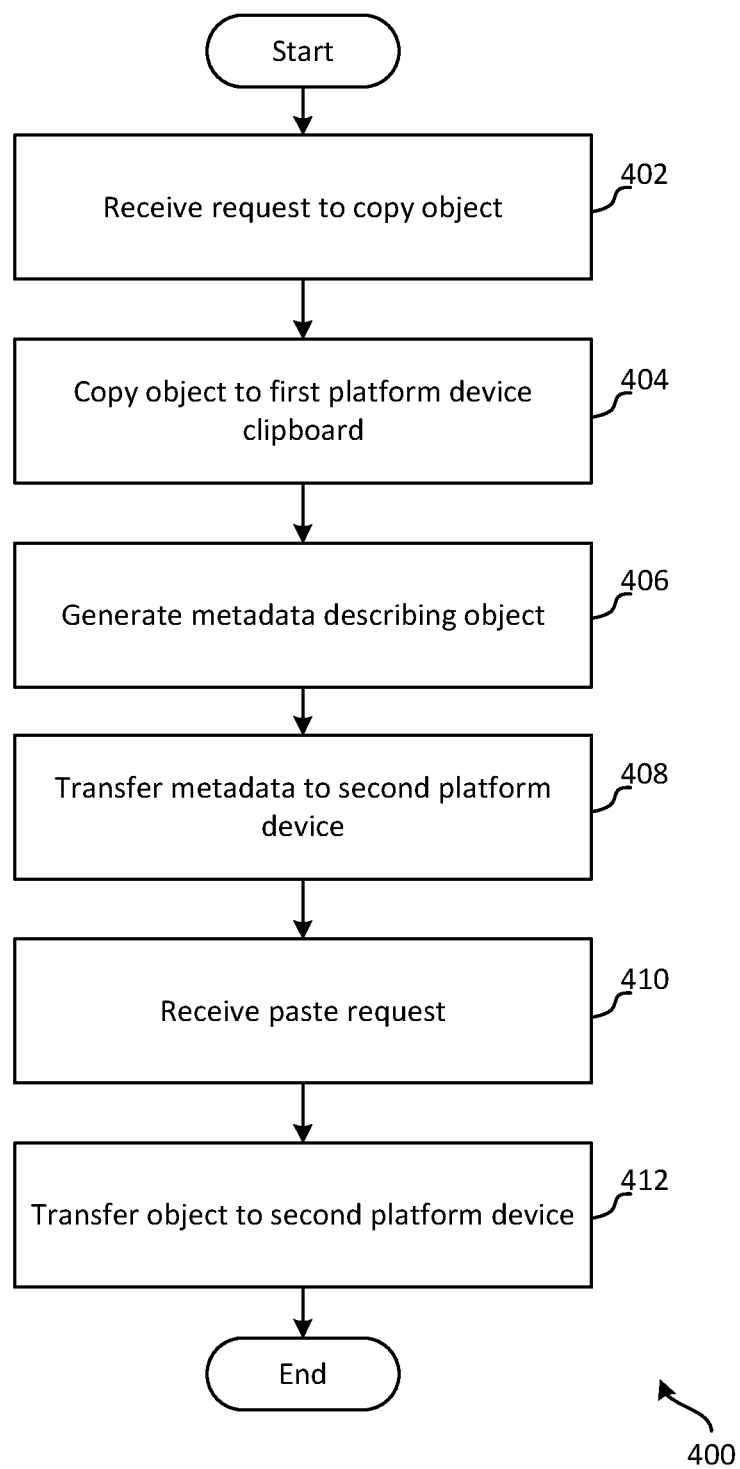
FIG. 4 is an exemplary method for assisting with cross-platform copy and paste operations from the copying platform perspective.

FIG. 4 is an exemplary method 400 for assisting with cross-platform copy and paste operations from the copying platform perspective. The method 400 begins at a start operation and flow continues to operation 402 where a request to copy an object from an application executed on a first platform device is received. In some examples, rather than receiving the request from an application, the request may be received from a shell construct (e.g., a file browsing construct, a desktop, etc.). The request may additionally or alternatively be received by a cross-platform clipboard application associated with the first platform.

From operation 402 flow continues to operation 404 where the object is copied to an electronic clipboard that is local to the first platform device. An electronic clipboard is an exemplary temporary storage location where the object may be copied to. The object may additionally or alternatively be copied to one or more other temporary storage locations on the first platform device (e.g., an application-specific temporary storage location via an application-specific API, via a user interface accessibility tree, etc.).

From operation 404 flow continues to operation 406 where metadata describing the object is generated and/or copied from the object. The metadata may be generated and/or copied by a metadata tagging engine of the first platform. In some examples, the metadata may describe one or more of: a file type of the object, a size of the object, a location of the object, a string number of the object, a pixel number of the object, and/or a frame number of the object.

From operation 406 flow continues to operation 408 where the metadata describing the object is transferred to a second platform device. In some examples, the metadata may be transferred from a cross-platform clipboard application of the first platform to a cross-platform application of the second platform. The first platform and the second platform may be connected via Bluetooth, Wi-Fi, a local area network, and/or a network connection. In some examples, the connection may be encrypted for security purposes.

From operation 408 flow continues to operation 410 where a paste request to transfer the object to the second platform device is received. The paste request may be received by the first platform device via the established connection with the second platform device where the paste request was input. The paste request may be received from an application and/or shell construct of the second platform device where the paste command originated. In some examples, the paste command may be relayed through a cross-platform application. In additional examples, the paste request may include a description of one or more specific file types and/or formats that the second platform device requires the object to be sent back to it in.

From operation 410 flow continues to operation 412 where the object is transferred to the second platform device where the object may be injected/pasted into an application and/or shell construct where the paste command was input. According to some examples, the object may be translated from a format that is native to the first platform to a format that is native, readable, and/or executable to the second platform.

From operation 412 flow moves to an end operation and the method 400 ends.

Figure 5:
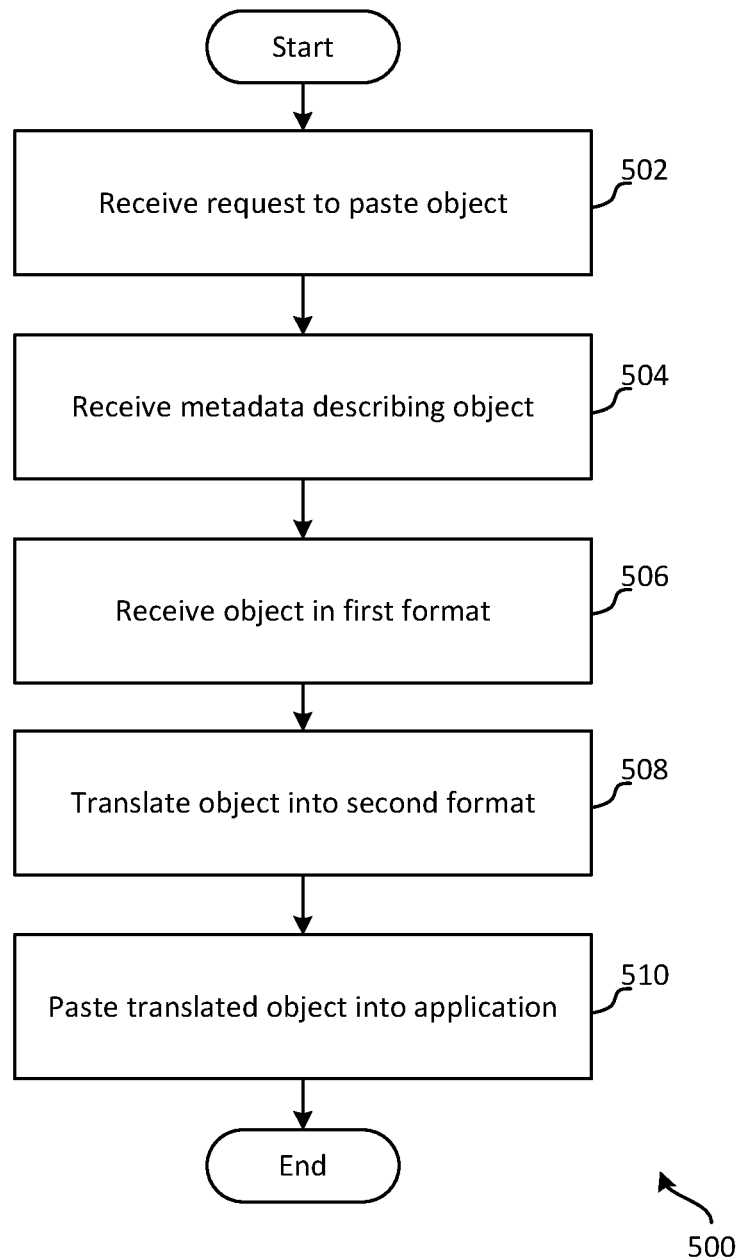
FIG. 5 is an exemplary method for assisting with cross-platform copy and paste operations from the pasting platform perspective.

FIG. 5 is an exemplary method 500 for assisting with cross-platform copy and paste operations from the pasting platform perspective. The method 500 begins at a start operation and flow moves to operation 502 where a request to paste an object is received. In some examples, the request may be received in an application (e.g., a paste command in a word processing application, a paste command in presentation application, a paste command in a spreadsheet application, etc.). In other examples, the request may be received in a shell construct (e.g., a command to paste an object in a desktop, a command to paste an object in a file browsing construct, etc.).

From operation 502 flow continues to operation 504 where metadata describing the object is received. The metadata may be received from a first platform where the object was copied. The metadata may describe one or more of: a file type of the object, a size of the object, a location of the object, a string number of the object, a pixel number of the object, and/or a frame number of the object.

From operation 504 flow continues to operation 506 where the object is received in a first format. According to examples, the object may be received by a cross-platform clipboard application executed by the second platform device. The object may be received in a format that is compatible with the first platform device but not the second platform device.

From operation 506 flow continues to operation 508 where the object is translated to a format that is native to the second platform device. For example, if a determination is made that the object in its native format from the first platform device is not compatible with the second platform device and/or a construct (e.g., application, shell) of the second platform device where the paste command was received, a translation engine may translate the object into a format that is compatible with the second platform device and/or a construct of the second platform device where the paste command was received. In some examples, the translation of the object may occur prior to the first platform device sending the object to the second platform device. In other examples, the translation of the object may occur after the object is sent from the first platform device to the second platform device.

From operation 508 flow continues to operation 510 where the object is pasted into the application executed on the second platform device. That is, at operation 510, once the object has been translated into a format that is compatible with the second platform device and/or a construct of the second platform device where the paste command was received, the object may be pasted into the construct where the paste command was received (e.g., an application where the paste command was received, a shell construct where the paste command was received).

From operation 510 flow continues to an end operation and the method 500 ends.

Figure 6:
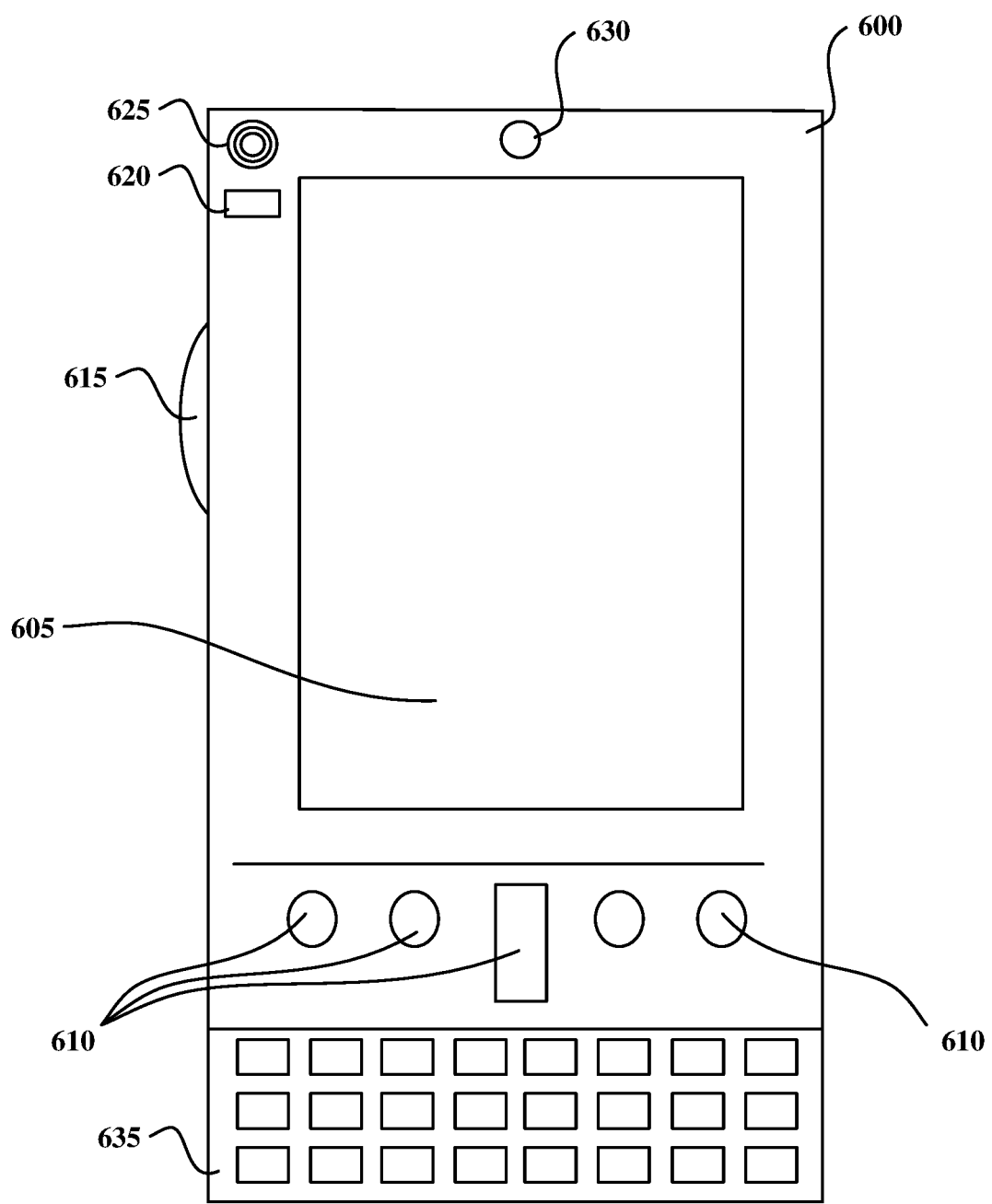
FIGS. 6 and 7 are simplified diagrams of a mobile computing device with which aspects of the disclosure may be practiced.
Figure 7:
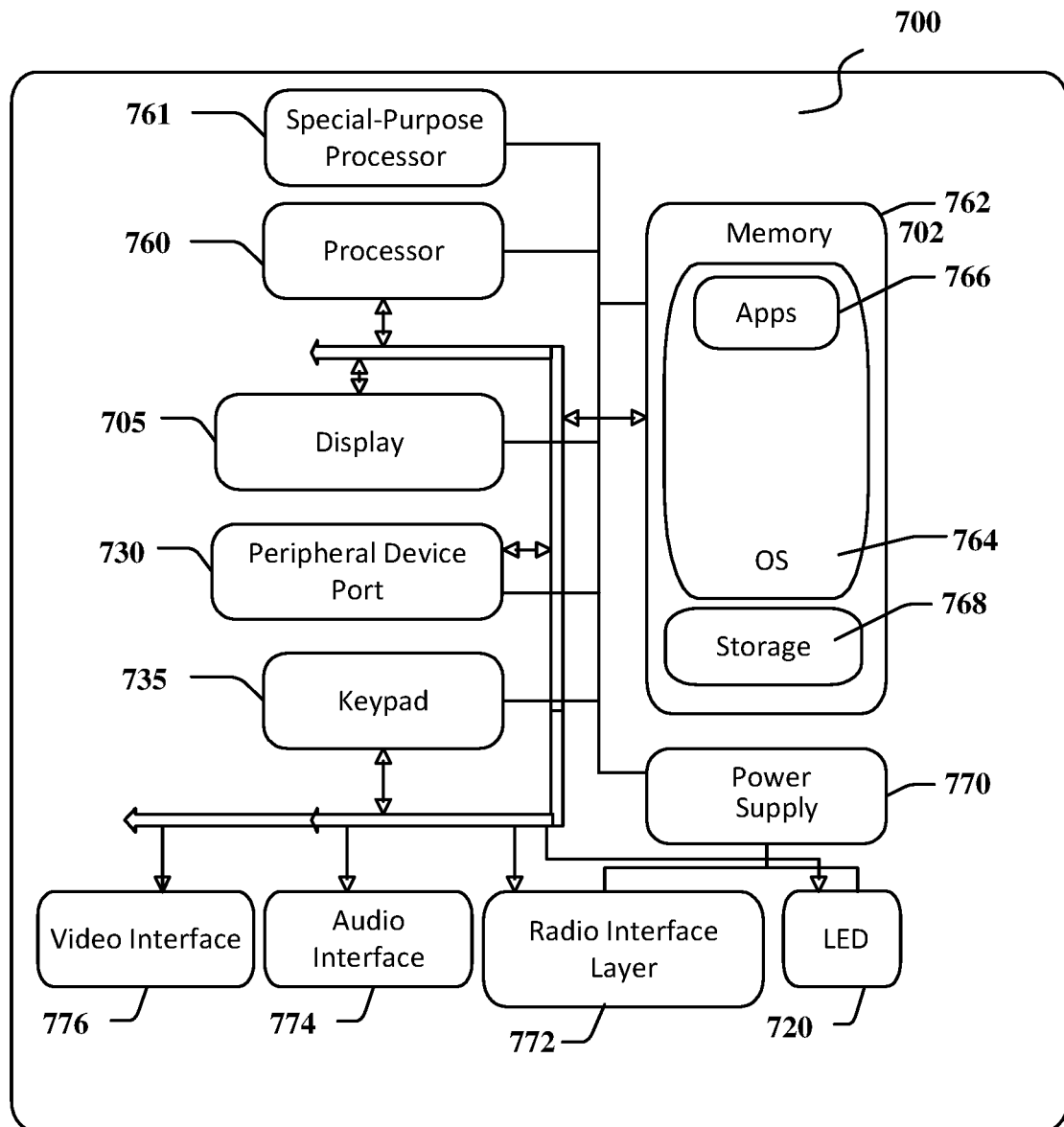

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a user experience transformation computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
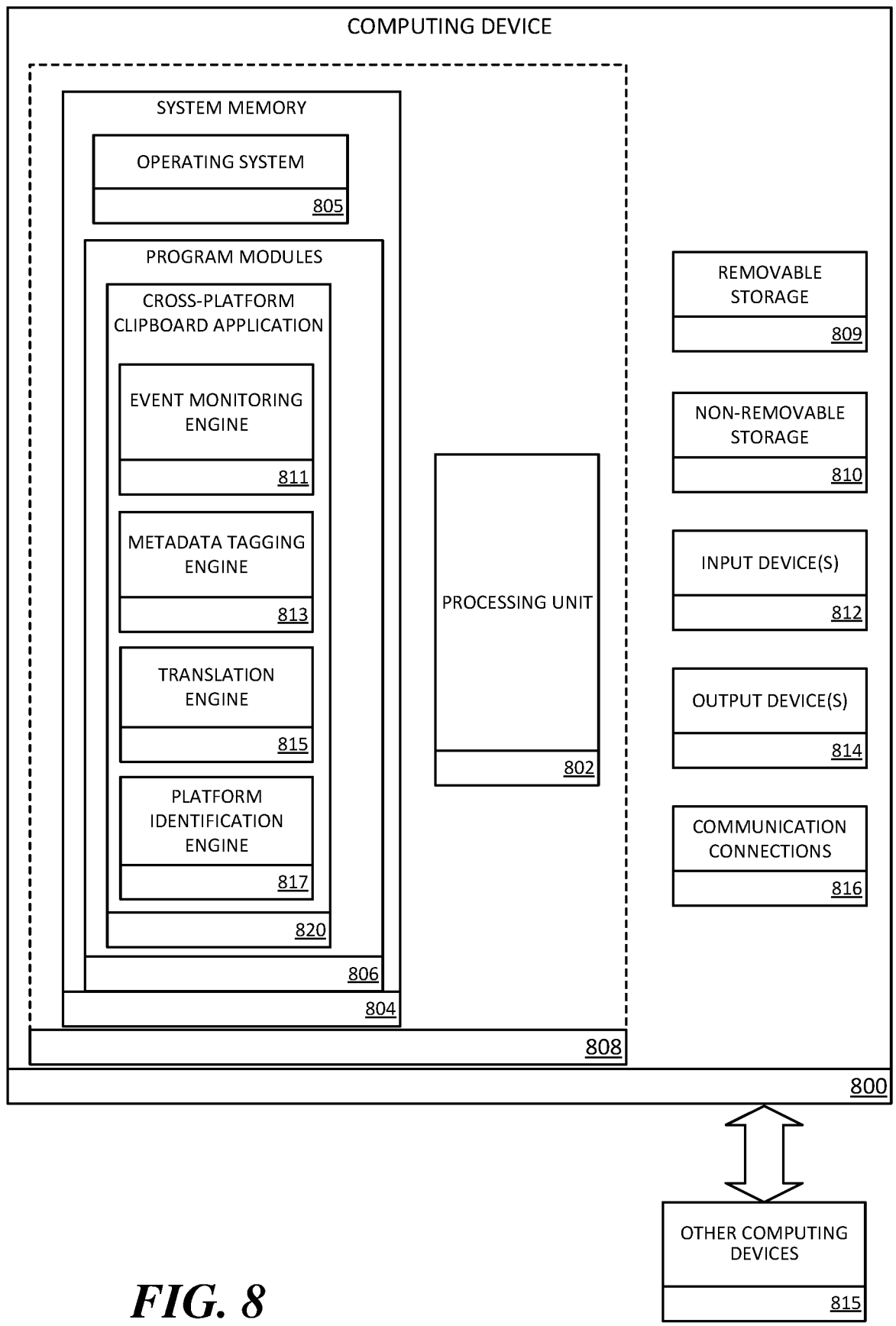
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for copying and pasting objects across devices and platforms. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more cross-platform clipboard applications. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., cross-platform platform application 820) may perform processes including, but not limited to, the aspects, as described herein. According to examples, event monitoring engine 811 may monitor event data related to copy and paste operations from other connected devices. Metadata tagging engine 813 may perform one or more operations associated with generating and/or copying metadata from a copied object and sending it to a connected device. Translation engine 815 may perform one or more operations associated with translating an object from a first format that is native to a first platform device to one or more additional formats that are compatible with a second platform device. Platform identification engine 817 may perform one or more operations associated with identifying a platform of a second device that a first device is connected to and determining whether object types are compatible amongst the two platforms.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
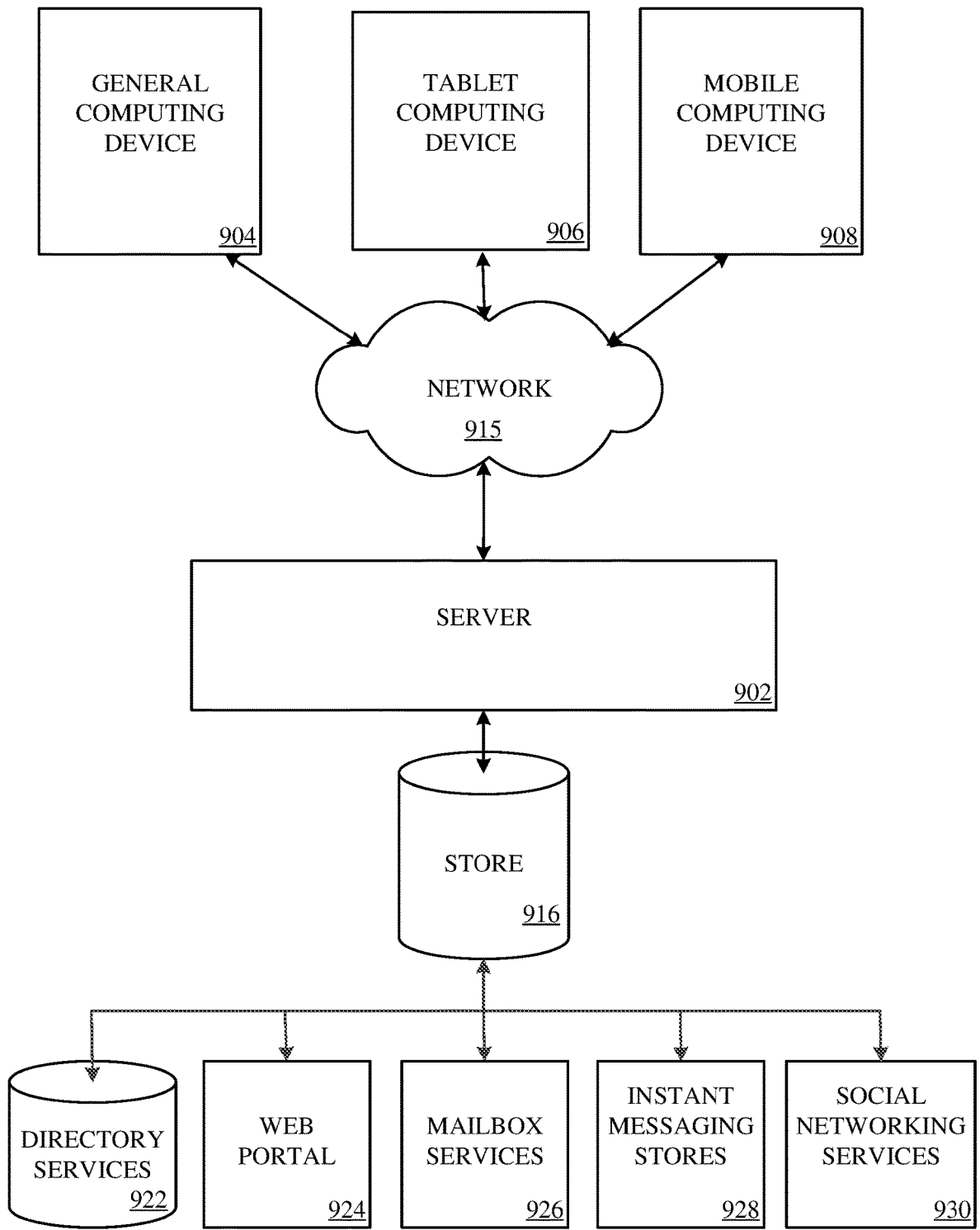
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for assisting with cross-platform copy and paste operations, the method comprising:
   receiving a request to copy an object from a construct executed on a first platform device;
   copying the object to a temporary storage location that is local to the first platform device;
   generating metadata describing the object, wherein the metadata describes at least a file type of the object;
   transferring the metadata describing the object to a second platform device while maintaining the copied object at the temporary storage location that is local to the first platform device based on at least one of:
   a size of the object,
   network conditions, and
   a likelihood that the object will be pasted by the second platform device;
   receiving a paste request to transfer the object to the second platform device; and
   transferring the object to the second platform device.

2. The computer-implemented method of claim 1, wherein the temporary storage location is an electronic clipboard.

3. The computer-implemented method of claim 1 wherein the metadata further describes a size of the object.

4. The computer-implemented method of claim 1, wherein the metadata further describes a location of the object.

5. The computer-implemented method of claim 1, further comprising:
   identifying a construct of the second platform device where the paste request was initiated; and
   determining whether the object is in a format that is executable by the construct of the second platform device.

6. The computer-implemented method of claim 5, further comprising:
translating, if the object is determined not to be in a format that is executable by the construct of the second platform device, the object from a first file type that is native to the first platform to a file type that is executable by the construct of the second platform device.

7. The computer-implemented method of claim 1, further comprising:
translating the object from a first file type that is native to the first platform device to a file type that is native to the second platform device.

8. The computer-implemented method of claim 1, wherein the construct is an application executed on the first platform device.

9. The computer-implemented method of claim 1, wherein the construct is a shell construct of the first platform device.

10. A system for assisting with cross-platform copy and paste operations, the system comprising:
a memory for storing executable program code; and
a processor, functionally coupled to the memory, the processor being responsive to computer-executable instructions contained in the program code and operative to:
establish a connection between a first platform device and a second platform device;
receive a request to copy an object from a shell construct of the first platform device;
copy the object to a temporary storage location on the first platform device;
transfer metadata describing the object to the second platform device while maintaining the copied object at the temporary storage location on the first platform device based on at least one of:
a size of the object,
network conditions, and
a likelihood that the object will be pasted by the second platform device;
receive an indication that a paste command has been received at an application executed by the second platform device;
determine that the object is of a file type that is not executable by the application executed by the second platform device;
translate the object to a file type that is executable by the application executed by the second platform device; and
transfer the object to the second platform device.

11. The system of claim 10, wherein the processor is further responsive to the computer-executable instructions contained in the program code and operative to:
paste the translated object into the application executed by the second platform device.

12. The system of claim 10, wherein the indication that the paste command has been received at the application executed by the second platform device comprises a request, from the second platform device, for the object in a specific file type that is executable by the application executed by the second platform device.

13. The system of claim 10, wherein the metadata describes a file type of the object and a size of the object.

14. A computer-readable storage device comprising executable instructions that, when executed by a processor, assist with cross-platform copy and paste operations, the computer-readable storage device including instructions executable by the processor for:
receiving a request to copy an object from a construct executed on a first platform device;
copying the object to a temporary storage location that is local to the first platform device;
generating metadata describing the object, wherein the metadata describes at least a file type of the object;
transferring the metadata describing the object to a second platform device while maintaining the copied object at the temporary storage location that is local to the first platform device based on at least one of:
a size of the object,
network conditions, and
a likelihood that the object will be pasted by the second platform device;
receiving a paste request to transfer the object to the second platform device; and
transferring the object to the second platform device.

15. The computer-readable storage device of claim 14, wherein the temporary storage location is an electronic clipboard.

16. The computer-readable storage device of claim 14 wherein the metadata further describes a size of the object.

17. The computer-readable storage device of claim 14, wherein the metadata further describes a location of the object.

18. The computer-readable storage device of claim 14, wherein the instructions are further executable by the processor for:
identifying a construct of the second platform device where the paste request was initiated; and
determining whether the object is in a format that is executable by the construct of the second platform device.

19. The computer-readable storage device of claim 18, wherein the instructions are further executable by the processor for:
translating, if the object is determined not to be in a format that is executable by the construct of the second platform device, the object from a first file type that is native to the first platform to a file type that is executable by the construct of the second platform device.

20. The computer-readable storage device of claim 14, wherein the instructions are further executable by the processor for:
translating the object from a first file type that is native to the first platform device to a file type that is native to the second platform device.

* * * * *